(12) United States Patent
Hampp et al.

(10) Patent No.: US 6,616,964 B1
(45) Date of Patent: Sep. 9, 2003

(54) METHOD AND PREPARATION FOR THE PHOTOCHROMIC MARKING AND/OR FOR SECURING THE AUTHENTICITY OF OBJECTS

(75) Inventors: Norbert Hampp, Schillerstrasse 10, D-35287 Amöneburg-Rossdorf (DE); Arne Seitz, Marburg (DE)

(73) Assignee: Norbert Hampp, Amoneburg-Rossdorf (GB)

( * ) Notice: Subject to any disclaimer, the term of this patent is extended or adjusted under 35 U.S.C. 154(b) by 0 days.

(21) Appl. No.: 09/937,963

(22) PCT Filed: Mar. 31, 2000

(86) PCT No.: PCT/EP00/02905
§ 371 (c)(1),
(2), (4) Date: Jan. 8, 2002

(87) PCT Pub. No.: WO00/59731
PCT Pub. Date: Oct. 12, 2000

(30) Foreign Application Priority Data

Mar. 31, 1999 (DE) .......................... 199 14 702

(51) Int. Cl.⁷ .............................. B44F 1/08; B44F 1/12; B41M 3/14; C09D 11/04
(52) U.S. Cl. ........................ 427/7; 427/256; 427/288; 106/31.32; 106/31.64; 106/31.94; 252/586
(58) Field of Search .................... 427/7, 256, 288; 106/31.13, 31.64, 31.32, 31.94; 252/584, 586

(56) References Cited

U.S. PATENT DOCUMENTS

| | | | | |
|---|---|---|---|---|
| 4,927,180 A | * | 5/1990 | Trundle et al. | 283/70 |
| 5,518,858 A | * | 5/1996 | Dyukova et al. | 430/167 |
| 5,807,625 A | | 9/1998 | Amon et al. | |
| 5,872,648 A | * | 2/1999 | Sanchez et al. | 359/290 |
| 5,920,058 A | * | 7/1999 | Weber et al. | 235/457 |

FOREIGN PATENT DOCUMENTS

| | | | |
|---|---|---|---|
| DE | 195 14 247 A | | 10/1996 |
| DE | 199 61 841 A1 | * | 6/2001 |
| JP | 02104600 A | * | 4/1990 |
| WO | 98/06084 A | | 2/1998 |

OTHER PUBLICATIONS

Weber, D. et al., "Novel implementation of nonlinear joint transform correlators in optical security and validation", 1999, Optical Engineering, vol. 38, No. 1, pp. 62–8.

* cited by examiner

Primary Examiner—Shrive P. Beck
Assistant Examiner—Kirsten Crockford Jolley
(74) Attorney, Agent, or Firm—Sutherland, Asbill & Brennan LLP

(57) ABSTRACT

Method and preparation for the photochromic labeling and/or for protecting the authenticity of objects, in which bacteriorhodopsin materials and preparations therefrom are used for application to the objects; preference is given to using a combination of low-level and high-level security features in said bacteriorhodopsin materials and preparations therefrom.

23 Claims, 1 Drawing Sheet

METHOD AND PREPARATION FOR THE PHOTOCHROMIC MARKING AND/OR FOR SECURING THE AUTHENTICITY OF OBJECTS

The invention relates to a method for protecting the authenticity of an object by applying a photochromic ink to the object.

Safety applications for protecting the authenticity of documents or objects comprise the use of suitable security features or authentication labels. The use of photochromic materials for safety applications has been described, for example, in U.S. Pat. No. 4,927,180. In the known examples, the photochromic identification feature is made visible by using UV light. However, the identification feature used is as such detectable only with difficulty, if at all, so that there is a danger of the user not noticing the absence of the identification feature. Due to the use of UV light, the eyes of the authenticity checker require suitable protection. The use of UV light for identifying the security feature can therefore be regarded as disadvantageous. U.S. Pat. No. 5,807,625 describes a similar prior art. Here too, UV light is used for visualizing the security feature.

Organic photochromic materials which said documents disclose have a typical switching cycle number of $10^4$–$10^5$. This limits the number of possible checking processes for identifying the security feature. Using said security features for automated test processes such as, for example, in automated telling machines or access control devices is therefore possible only with limitations, if at all.

It is furthermore desirable to be able to identify a particular batch of a label preparation and thus, for example when the preparations prepared for security purposes have been lost or illegally removed, to be able to determine the particular origin. The security features disclosed in said documents of the prior art cannot be used for applications of this kind.

In addition, conventional photochromic materials have the disadvantage of one of their two switching states having no noticeable inherent coloration.

It is an object of the invention to provide an optically detectable security feature for which both the bleaching process and the extinction process can be carried out using light of the visible wavelength range. In this manner it would be possible to induce a color change using inexpensive and universally available light sources, for example light-emitting diodes. Even with the light of a simple lamp, a test would then be possible and be detectable with the naked eye. Furthermore, it would be desirable to provide a security feature which has a switching cycle number of greater than $10^4$–$10^5$.

Another object is to provide a multiplicity of structurally similar photochromic materials which differ in their coloration and/or their color change.

While the security features known from the prior art, owing to the small technical effort necessary for verifying them, can be defined as low-level security features, another object is to provide additionally high-level security features the verification of which is technically demanding and thus impossible for an unskilled person.

WO 98/06084 discloses the use of nucleic acid molecules, in particular DNA molecules, which can be detected by suitable amplification reactions such as, for example, the PCR reaction by means of specific primers, as invisible high-level security feature.

According to the present invention, a material, namely bacteriorhodopsin (BR), in which a low-level security feature such as, for example, photochromism can be combined with a high-level security feature which, for example, allows identification of individual batches has been successfully found and this material has been successfully used for labeling and authenticating objects.

A method according to the invention for protecting the authenticity of objects by using a bacteriorhodopsin-containing ink is provided, with preferred developments of said methods being described in the claims.

According to the invention, the abovementioned objects are achieved by a method for protecting the authenticity of an object by applying a photochromic ink to the object, which comprises using a photochromic ink which contains as photochromic portion at least one bacteriorhodopsin variant which when illuminated with light of the visible wavelength range undergoes a visually detectable reversible change of state, in particular color change, utilizable as low-level security feature for an authenticity check, and which ink has in addition to the low-level security feature one or more visually undetectable high-level security features which is/are detectable only by instrumental analysis.

The present invention thus relates to the use of a photochromic ink in a method for protecting the authenticity of an object. The ink to be used according to the invention contains at least one bacteriorhodopsin variant as photochromic portion. Such a BR variant provides both a visually detectable low-level security feature for the purpose of an authenticity check and inherently an additional high-level security feature which is detectable only by means of instrumental analysis.

Photochromism means a light-induced reversible change of state (in particular color change) of a substance, during which the color (absorption spectrum) of the starting substance changes. It is then possible for the reverse reaction to be started, for example, by light of a different wavelength or by heat. By using according to the invention a bacteriorhodopsin variant which undergoes a change of state when illuminated with light of the visible wavelength range as photochromic portion, illumination with UV light is not required according to the invention. As a result, it is possible to dispense with the disadvantages connected with the use of UV light, in particular the equipment requirements and protective measures connected therewith.

The bacteriorhodopsin variants used according to the invention are preferably those in which both and particularly preferably all switching states are colored.

One aspect of the invention therefore comprises a method for protecting the authenticity of objects, in which method a photochromic preparation in the form of an ink containing bacteriorhodopsin and/or a bacteriorhodopsin variant as the photochromic portion is applied to the object, illumination of this photochromic preparation with light of the visible wavelength range leading to a change of state, in particular color change, which is detectable for the purpose of an authenticity check. The detectable change of state, in particular color change, is preferably reversible, the bacteriorhodopsin variants used according to the invention having in particular a switching cycle number (i.e. a color change for checking purposes) $>10^5$, more preferably $>10^6$ and particularly preferably $>10^7$. As a result, a repeated security verification of the authenticity-protected object within the framework of routine measures is possible on the basis of the low-level security feature. If the change of state is made irreversible, for example by destroying the photochromically active part of the bacteriorhodopsin, the low-level security feature can be canceled or rendered invalid.

The authenticity check is preferably carried out by illuminating the photochromic ink with visible light in order to bleach the bacteriorhodopsin, and the photochromic ink is then illuminated with light of a second wavelength range, in order to revert the bacteriorhodopsin photochemically to the initial state, or thermal relaxation to the unbleached state takes place. It is possible to observe the change in the optical properties during the bleaching and/or extinction process with the naked eye or using an optical instrument.

The term "low-level security feature" denotes a feature whose presence or absence can be verified by unskilled persons without technical aids in a simple manner or with low technical complexity.

The term "high-level security feature" on the other hand, denotes a feature when it is impossible for the unskilled person to detect its presence or absence and which can commonly be verified only by specialists under high technical complexity.

Low-level security features are therefore features whose analysis uses little financial means (pfennigs) and can be carried out by anyone, whereas high-level security features are those features whose analysis can amount to several hundred thousand deutschmarks and which are carried out by specialists in laboratories. Low-level security features provide protection against "Everyman" forgery techniques, since photochromism cannot be reproduced by known techniques. High-level security features comprise individualization of the individual security colors for applications or users, down to the level of batch coding.

For example, the photochromism of bacteriorhodopsin variants, i.e. the color change on illumination with visible light, readily detectable by the observer, represents a low-security feature. Further examples of visually detectable low-level security features are various initial colorations of the bacteriorhodopsin-containing photochromic inks, various photocycles or/and altered kinetic behavior.

In contrast to the low-level security features which anyone can visually perceive in a simple manner, high-level security features can be verified only with the aid of technically complicated analytical apparatuses, i.e. by means of instrumental analysis. Verification of high-level security features thus requires technical aids. Thus, for example, substitution of amino acids in the bacteriorhodopsin sequence leads to variants whose mass deviating from the wild-type can be detected by means of mass spectrometry. However, it is also possible by attaching atoms or/and molecules to form bacteriorhodopsin variants which, for example owing to their different mass, their fragmentation pattern or other different properties, can be detected, for example, via ESR or NMR.

An amino acid substitution makes it possible to provide in particular the following high-level security features. In a detection using liquid chromatography mass spectrometry/mass spectrometry (e.g. ESI), mass spectrometry can measure a change in the molecule mass or/and a characteristic change in the fragmentation pattern. Detection using HPLC and detection of absorption or fluorescence can detect characteristic changes of peptidic cleavages, for example a deletion or addition of a cleavage site, which increases or decreases the number of fragments. Using these methods it is also possible to detect a change in the number of aromatic amino acids. The binding of specific monoclonal antibodies to the bacteriorhodopsin sequence or sections thereof can be detected by means of ELISA or similar methods.

Examples of high-level security features obtained by attachment are spin labels which can be detected by means of ESR and also modifications which are introduced by means of protein modification reagents labeled with stable isotopes (e.g. $^{13}C$, $^{15}N$).

The photochromic ink used according to the invention then provides the object to be protected with both a low-level security feature such as, for example, photochromism and a high-level security feature such as, for example, sequence information of the bacteriorhodopsin used, which information allows identification of individual batches, for example.

The method of the invention thus provides double security for the marked objects. While low-security features are readily recognizable and therefore easily and quickly verifiable, high-level security features are hidden security features which can be detected only by complicated analysis and are possibly not recognized at all by a potential imitator or forger. A potential imitator also does not know initially whether a particular feature must be included or not, since there is a whole number of high-level security features which can be combined with bacteriorhodopsin.

This additional security facilitates high protection against imitation and at the same time facilitates a coding of the objects, for example down to a manufacturer or batch coding. Using a bacteriorhodopsin variant additionally links the low-level security feature and the high-level security feature inextricably with one another, since they are provided by the same molecule.

The objects labeled according to the invention can then be verified in various ways. For a routine verification such as can be carried out, for example, at a bank for any incoming bank notes, it is possible, for example, to check only for the low-level security feature by simple means. It is also possible to verify two or more low-level security features in parallel. For an examination in more detail it is then possible to verify one or more high-level security features of the bacteriorhodopsin variant(s). The presence of at least two high-level security features can be obtained by using two different bacteriorhodopsin variants or by using a twice modified bacteriorhodopsin variant. Furthermore, the combined verification of low-level security and high-level security features is also possible.

Bacteriorhodopsin is a membrane protein of halophilic bacteria. The protein bacteriorhodopsin can be obtained in large quantities from microorganisms of the genus Halobacterium. With its basic photochemical and physical properties, wild-type bacteriorhodopsin is well known to the skilled worker as photochromic material which, activated by light, runs through a cyclic sequence of intermediates. The photochromic properties are modeled here by utilizing a highly simplified photocycle which has only two states left which are referred to as B and M. states. By illuminating with light of 568 nm wavelength the purple B state is converted to the yellow M state which for its part is reverted to the B state by absorption of light of 412 nm wavelength. It is thus possible to bleach bacteriorhodopsin material with yellow-green light, with the purple color disappearing and the yellow color appearing. It is then possible to wait until the purple color is reestablished by thermal relaxation, or blue light is used in order to revert the bacteriorhodopsin material photochemically again to the B state. An overview of said bacteriorhodopsin properties can be found in N. N. Vsevolodov, Biomolecular Electronics: An introduction via Photo-sensitive Proteins, Birkhäuser, Boston, 1998 and in D. Oesterhelt, C. Bräuchle, N. Hampp, Bacteriorhodopsin: A Biological Material for Information Processing, Quarterly Review of Biophysics, 24 (1991) 425–478.

It is known to the skilled worker that there is a substantial number of bacteriorhodopsin variants which have the same initial color as the wild-type but differ considerably in some of the kinetics of their photo cycle. A preferred example is the BR-D96N variant whose properties are described in various publications, for example in A. Miller, D. Oesterhelt, Kinetic Optimization of Bacteriorhodopsin by Aspartic Acid 96 as an Internal Proton Donor, Biochim. Biophys. Acta 1020 (1990) 57–64.

According to the invention, preference is given to using a bacteriorhodopsin which advantageously can be bleached with visible light. A wavelength range from 500 to 600 nm has proved advantageous. The bacteriorhodopsin can then be reverted to the initial state by thermal relaxation or by illumination with light of a second wavelength range. For this second wavelength range it is advantageous to use wavelengths in the range 400 to 450 nm.

The longer the lifetime of the M state, the easier it is to detect the visible bleaching of the bacteriorhodopsin under illumination. Typically, a bleaching of about 90% of the bacteriorhodopsin material is achieved using a light output of less than 100 mW/cm$^2$ at 532 nm.

Up until now, no preparations such as, for example, coatings, inks or printing inks for application by means of printing and/or application in the field of security, which preparations contain bacteriorhodopsin as photochromic component, have been described in the literature. Compared with said conventional photochromic materials, bacteriorhodopsin provides the following advantages:

1. Light of visible wavelength can be used for the color change.
2. Both switching states have a detectable inherent coloration.
3. Application of genetic methods makes it possible to prepare functional variants of bacteriorhodopsin by amino acid exchange. The bacteriorhodopsin variants obtained in this way differ from wild-type bacteriorhodopsin in their kinetics (BR-D96N) and/or their initial absorption and their photocycle (BR-D85N).
4. The number of possible switching cycles is higher than $10^5$.

In microorganisms of the genus Halobacterium bacteriorhodopsin is present in the "purple membrane" form. Preparation and isolation of bacteriorhodopsin in purple membrane form is technically well known (cf. e.g. EP 0 406 850 B1).

In the wild-type, bacteriorhodopsin is found in the form of a two-dimensional part of the cell membrane, which part consists exclusively of bacteriorhodopsin and lipids. This part is called purple membrane. In this form, bacteriorhodopsin is thermodynamically particularly stable and, for a protein, even extra-ordinarily stable. This is a precondition for a multiplicity of technical applications and also in the area of the preparations of the invention, where bacteriorhodopsin is used as pigment. According to the invention, particular preference is therefore given to using BR or/and a BR variant in the purple membrane form.

The bacteriorhodopsin used may be the wild-type but according to the invention it is preferred for the photochromic ink to contain at least one bacteriorhodopsin variant as photochromic portion. A bacteriorhodopsin variant differs from the wild-type by at least one modification. Preference is given to selecting the bacteriorhodopsin variant from functional variants, sequence variants, derivatization variants, chromophoric variants, isotopic variants or/and spin label variants.

Bacteriorhodopsin sequence variants which may also be bacteriorhodopsin functional variants may be expressed in Halobacterium salinarum. In this connection, the bacteriorhodopsin is incorporated into the cell membrane which can then be isolated. In some cases, the material obtained is not two dimensionally crystalline but the bacteriorhodopsin is membrane-bound.

When generating bacteriorhodopsin variants by specific exchange of individual amino acids, sequence variants can be prepared by exchanging amino acids in regions unimportant for the photochromic function. An amino acid can be exchanged by site-directed mutagenesis of the gene coding for the bacteriorhodopsin.

This, however, now provides the development of a high-level security feature, since the specific amino acid exchange in the bacteriorhodopsin molecule can be used for identification purposes and thus becomes a security feature. By replacing, for example, only four amino acid positions with the 20 biogenic amino acids, it is possible to prepare $4^{20} \approx 10^{12}$ distinguishable bacteriorhodopsin materials.

As a result, it is possible without great technical complexity to prepare an enormous multiplicity of bacteriorhodopsin molecules which comprise photochromic functionally identical bacteriorhodopsin materials but which differ from one another unambiguously, that is to say in their amino acid sequence.

The additional high-level security feature cannot be detected without complicated analysis. The prior art describes various methods which are still able to detect reliably the composition of bacteriorhodopsin materials having said modifications. First and foremost, mention must be made here of mass spectrometry (cf. K. L. Schey, D. I. Papac, D. R. Knapp and R. K. Crouch, Matrix-Assisted Laser Desorption Mass Spectrometry of Rhodopsin and Bacteriorhodopsin, Biophys., J. 63 (1992), 1240–1243, P. Hufnagel, U. Schweiger, C. Eckerskorn and D. Oesterhelt, Electrospray Ionization Mass Spectrometry of Genetically and Chemically modified Bacteriorhodopsins, Anal. Biochem. 243 (1996) No. 1, 46–54, L. E. Ball, J. E. Jr. Oatis, K. Dharmasiri, M. Busman, J. Wang, L. B. Cowden, A. Galijatovic, N. Chen, R. K. Crouch and D. R. Knapp, Mass Spectrometric Analysis of Integral Membrane Proteins: Application to Complete mapping of Bacteriorhodopsins and Rhodopsin, Protein Sci. 7 (1998) No. 3, 758–764). The preferred bacteriorhodopsin materials combine a low-level security feature, namely the optically readily detectable photochromism, with a high-level security feature, for example a sequence variation in the amino acid sequence of the bacteriorhodopsin itself.

The invention comprises low-level security features which include 1. various initial colors of the bacteriorhodopsin materials,
2. various photocycles,
3. modified kinetic behavior.

The low-level security feature of the invention can preferably be achieved by using functional variants of bacteriorhodopsin but can also be achieved by other bacteriorhodopsin variants such as, for example, bacteriorhodopsin derivatization variants and/or chromophoric variants of bacteriorhodopsin.

The term "functional variants of bacteriorhodopsin" is to be understood as meaning in particular variants which differ from bacteriorhodopsin wild-type in their absorption spectrum and/or their photocycle.

An example of a known functional variant is variant D96N in which aspartic acid at position 96 has been replaced by asparagine. This functional variant of bacteriorhodopsin and some others are described in H. Otto, T. Marti, M. Holz, T. Mogi, M. Lindau, H. G. Khorana and M. P. Heyn, Proc. Natl. Acad. Sci. U.S.A. 86 (1989), pp. 9228–9232 and T. E. Thorgeirsson, S. J. Milder, L. J. W. Miercke, M. C. Betlach, R. F. Shand, R. M. Stroud and D. S. Kliger, Biochemistry 30 (1991), pp. 9133–9142.

The term "bacteriorhodopsin derivatization variants" is to be understood as meaning in particular bacteriorhodopsin variants which differ from the wild-type by the covalent attachment of molecules. Such molecules may, for example, have the task of increasing the molecular weight of bacteriorhodopsin in order to be able to identify a molecule of this kind in mass spectrometry, or can be a colored molecule in order to modify in this way the bacteriorhodopsin absorption spectrum, or can be a fluorescent molecule in order to be able to observe in this way a bacteriorhodopsin-coupled fluorescence. Likewise, the bacteriorhodopsin material may also be coupled covalently to a polymer. The coupling reaction may be carried out, for example, according to Chignell & Chignell, Biophys. Biochem. Res. Commun. 62 (1975), p. 136–143 and according to Renthal et al., Biochemistry 22 (1983), p—p. 5–12.

Covalent coupling of suitable dyes to the bacteriorhodopsin molecules or/and simple admixing of passive dyes or pigments can strongly influence the initial color impression of the bacteriorhodopsin material or the photochromic ink and also the color impression of the bleached state. The visual impression of the developing color mixtures can be visualized clearly in a CIE diagram. Using known methods of this kind, the skilled worker can determine the color effect.

It is possible to couple linker molecules to the bacteriorhodopsin, which allow in turn the coupling of further compounds to said linker molecules. Molecules which can be attached for the object of the invention serve the purpose of increasing the molecular weight of bacteriorhodopsin in order to be able to identify a molecule of this kind in mass spectrometry.

The term "chromophoric variants of bacteriorhodopsin" is to be understood as meaning in particular bacteriorhodopsin variants which differ from the wild-type by the removal or exchange of the chromophoric retinylidene group for another molecule, in particular for "retinal analogs". The retinal analog can be bound covalently to bacteriorhodopsin via lysine 216.

Thus further possibilities of preparing bacteriorhodopsin variants are possible by replacing the chromophoric retinylidene group. This achieves a modification of the photophysical properties, and preferably dihydroretinal or 4-ketoretinal can be employed.

The term "isotopic variants of bacteriorhodopsin" is to be understood as meaning in particular those bacteriorhodopsin variants in which some or all amino acids are partly or completely labeled with $^{13}C$ or $^{15}N$. This can be achieved by adding some labeled amino acids to the growth medium or by using peptone which is labeled as whole molecule. The compounds labeled in this way can be identified by means of high resolution NMR.

The term "bacteriorhodopsin spin label variants" is to be understood as meaning in particular those bacteriorhodopsin variants which contain a spin label covalently bound to the bacteriorhodopsin molecule. This can be achieved, for example, by coupling a TEMPO (2,2,6,6-tetramethylpiperidine-N-oxyl) or DOXYL (4,4-dimethyloxazolidine-N-oxyl) or PROXYL (2,2,5,5-tetramethylpyrrolidine-N-oxyl) derivative covalently to the bacteriorhodopsin material. The presence and type of spin label can be checked by means of ESR.

The term "bacteriorhodopsin sequence variants" is to be understood as meaning in particular those bacteriorhodopsin variants which differ from the wild-type by the loss or exchange or addition of one or more amino acids but which do not essentially influence the photocycle. Examples of sequence variants of bacteriorhodopsin are D36C or variants in which amino acids are appended to the N terminus or C terminus.

The combination of modifications of the abovementioned variants leads to new preferred variants, as a result of which an enormous multiplicity of various bacteriorhodopsin preparations becomes possible. As a result, a high-level security feature is obtained, since the analysis becomes very complicated and, at the same time, each individual batch can be identified unambiguously on the basis of the large variety.

The bacteriorhodopsin variant is preferably selected from D36X, D96X and D85X, where X represents one of the naturally occurring amino acids. Particular preference is given to the BR variant selected from D36C, D96N and D85N.

Particular preference is given to mutants having an increased light sensitivity and in particular to materials as are used also for holography.

Besides bacteriorhodopsin, the bacteriorhodopsin preparation can furthermore contain a conventional non-photochromic pigment or/and a fluorochrome or/and a pigment covalently bound to bacteriorhodopsin or/and another photochromic pigment. By mixing the non-photochromic pigment or fluorochrome with bacteriorhodopsin, said pigment or fluorochrome can be hidden within the security label. In such an embodiment it may furthermore be expedient to use UV light in addition to visible light.

Furthermore it is possible to couple fluorescent or phosphorescent molecules to the bacteriorhodopsin molecules, resulting in the emission thereof being an additional feature. A suitable choice of the emission position can suppress the fluorescence when the bacteriorhodopsin material is in the unbleached state. This is achieved if there is a strong overlap of the positions of the initial bacteriorhodopsin absorption and of the emission of the fluorescent or phosphorescent material. In this case, the bacteriorhodopsin material absorbs the emitted photons and it is then impossible for the naked eye to perceive any fluorescence. The fluorescence becomes visible only if the bacteriorhodopsin material is bleached photochemically.

The composition of the applied bacteriorhodopsin material can be checked, for example, by determining the amino acid sequence of the bacteriorhodopsin material completely or partly by means of microanalytical sequencing or by measuring the reaction with a specific antibody by means of immunological methods.

Bacteriorhodopsin materials which include high-level security features preferably contain bacteriorhodopsin variants 1. having specifically modified amino acid sequences, the sequence change not influencing the photo-physical properties,
2. having covalently coupled molecules and
3. having amino acids labeled with $^{13}C$ and/or $^{15}N$ and/or other isotopes.

Particular preference is given to combinations of two or more of the above bacteriorhodopsin variant types.

In the method of the invention, particular preference is given to using at least one bacteriorhodopsin variant having the features:

a) the region required for the formation of the purple membrane form of the protein is unchanged compared with the bacteriorhodopsin wild-type and b) loops or/and the C terminus or/and the N terminus of the polypeptide chain contain, compared with the bacteriorhodopsin wild-type, at least one amino acid exchange comprising deletions, additions, insertions or/and substitutions, these amino acid exchanges not changing the photochromic properties of bacteriorhodopsin, which properties are determined by the photochromic region.

Such bacteriorhodopsins are unaltered compared with the bacteriorhodopsin wild-type in the region required for the formation of the purple membrane form of the protein. For the purposes of this invention it is also sufficient if the bacteriorhodopsin, despite small changes in this region, is still capable of forming a purple membrane.

The inventive changes in the amino acid sequence comprise amino acid exchanges such as, for example, deletion, insertion, substitution and/or addition at any positions within the entire polypeptide chain. Particular preference is given to additions of amino acids to the N or/and C termini or/and to the polypeptide chain loops which are located in particular outside the membrane. The changes carried out according to the invention for coding the high-level security feature are thus preferably not carried out in the bacteriorhodopsin region which influences the photochromic properties. When carried out in a suitable manner, the amino acid exchange in the loops and/or the C terminus or/and the N terminus of the polypeptide chain does not change the photochromic properties of the starting bacteriorhodopsin. It should be kept in mind here that it is possible to use as starting bacteriorhodopsin both a bacteriorhodopsin of the wild-type and an already modified bacteriorhodopsin, in particular BR-D96N.

The amino acid exchanges usable for analysis preferably effect changes in the bacteriorhodopsin molecule mass of at least one dalton, still more preferably at least 10 dalton and most preferably more than 100 dalton. For analysis, instruments and ionization methods of the prior art such as, for example, FTMS (Fourier transform mass spectrometer) and/or TOF (time-of-flight mass spectrometer) and/or MALDI (matrix-assisted laser desorption ionization) and/or ESI (electron spray ionization) are used.

The addition/insertion of amino acids may comprise in particular up to 1000 additional amino acids, preferably up to 100 amino acids, particularly preferably up to 50 amino acids and at least one, most preferably 3 to 20 amino acids. Addition of at least 6 histidine residues at the C terminus can be utilized in order to detect the presence of the bacteriorhodopsin variant via metal binding by means of XRF or TXRF.

Deletion or substitution affects in particular 1 to 10 and particularly preferably 1 to 4 amino acids.

A preferably used substitution variant is the bacteriorhodopsin variant whose aspartic acid residue in position 36 has been replaced by a cysteine residue (BR variant D36C).

The molecular weights of the amino acid sequence variants of the bacteriorhodopsin molecules can be determined by mass spectrometry using ESI or MALDI-TOF. After recalculating the mass spectra, the molar masses of the substances studied are obtained with a resolution of down to one mass number. The change in the amino acid sequence, for example also by deletion or insertion, leads to comparatively large mass number changes which are easily detectable analytically. Even if only a few amino acids are replaced by other amino acids, the resulting mass changes are analytically sufficient.

Preference is given to using a bacteriorhodopsin variant in which at least one amino acid has been added at the C terminus. It is furthermore preferred to use bacteriorhodopsin variants containing at least one cysteine. In another preferred embodiment at least one bacteriorhodopsin variant having a photocycle different from the wild-type or/and an initial color different from the wild-type is used.

Most preference is given to using bacteriorhodopsin variants which have a reduced light/dark adaptation. Bacteriorhodopsin whose maximum absorption is at 570 nm (B state) relaxes in the dark slowly with a half-life of about 10 to 20 minutes partly to a state of 548 nm maximum absorption, the "D state". In the bacteriorhodopsin wild-type an equilibrium of about 50:50 B state to D state is established in the dark. In the B state retinal has an all-trans configuration and in the D state a 13-cis configuration. During exposure, bacteriorhodopsin is first converted 100% to the B state from which the photocycle initiates during which the desired strong color change occurs (absorption shift to 412 nm).

If a bacteriorhodopsin-containing photochromic ink of the invention or the object labeled therewith has been stored in the dark over a relatively long period, then the bacteriorhodopsin has changed to its "dark adapted state". If the area to be checked is then illuminated with light for the first time in order to bleach the bacteriorhodopsin, said area seems to have a reduced light sensitivity or a reduced bleaching rate. This is caused by part of the illuminating light being used for transferring bacteriorhodopsin from the D state to the B state. If the once produced bleaching is reversed again, for example by using blue light, i.e. if the violet initial state is reestablished, then the material displays the desired high light sensitivity in immediately following further exposures. However, it is desirable that the photochromic properties appear already in the first cycle, even after storage in the dark. For this reason, bacteriorhodopsin variants having a reduced or completely absent light/dark adaptation are preferred materials for the uses of the invention.

Bacteriorhodopsin variants which have a reduced or absent light/dark adaptation may be obtained by using retinal analogs or by bacteriorhodopsin variants having a modified amino acid sequence. Particularly suitable examples are bacteriorhodopsins having a chemically modified chromophore such as, for example, 13-demethyl-11,14-epoxy-bacteriorhodopsin (M. Muradin-Szweykowska et al., Rec.: J. R. Neth. Chem. Soc. 102 (1983), 42–46. Further preferred variants are bacteriorhodopsins which contain a 13-substituted retinal, in particular a retinal which carries an H atom, an ethyl or a propyl group at position 13 (W. Gaertner et al., Biochemistry 27 (1988), 3497–3502. Arg-82, Asp-85 and Asp-212 mutants with reduced light adaptation which are likewise preferably used herein are described, for example, in M. P. Krebs et al., Proc. Natl. Acad. Sci. USA 90 (1993), 1987–1991. Further preferred mutants are Y185F (P. Rath et al, Biochemistry 32 (1993), 2272–2281) and also the mutants described in S. P. Balashow et al., Biochemistry 32 (1993), 10331, 10343 and in K. Ihara et al., Biophys. J. 67 (1994), 1187, 1191, in particular Arg-82-Ala and Met-145. Generally, preference is given to variants which also remain in the B state in the dark and do not change into the D state.

Molecules covalently coupled to bacteriorhodopsin molecules provide another option of high-level security features. The coupling of molecules makes another analytical dimension possible, for example via detection of particular properties of the attached molecules or via their mass. Attached molecules may be, for example, biotin and/or avidin or/and digoxygenin. It is also possible to attach molecules which can be detected separately by mass spectrometry. The coupling of spin label molecules such as, for example, TEMPO, DOXYL or PROXYL can be determined by ESR analysis which can also be carried out with limitations by using a solid. Amino acids labeled with the stable isotopes $^{13}$C and $^{15}$N can be detected by NMR analysis. (M. Engelhard, B. Hess, G. Metz, W. Kreutz, F. Siebert, J. Soppa and D. Oesterhelt, High resolution carbon-13-solid state NMR of bacteriorhodopsin: assignment of specific aspartic acids and structural implications of single site mutations, Eur. Biophys. J. 18 (1990), 17–24).

Surprisingly, high-level security features for authenticity checking may also be obtained by using polymeric molecules whose monomeric sequence is known and which are coupled to bacteriorhodopsin molecules, where appropriate. Polymeric molecules which may be used in this connection are, for example, oligopeptides, polypeptides, proteins, nucleic acids, peptidic nucleic acids (PNAs) or else synthetic, not naturally occurring polymers. The polypeptides and proteins may contain non-protein portions, the nucleic acids non-nucleic acid portions. The non-protein portions and the non-nucleic acid portions may include, for example, glycoside portions, biotin or/and digoxygenin or/and avidin.

Thus, it is also possible to admix one or more further polymers, in addition to BR, with the ink, which polymers provide as information-carrying components further high-level security features or, for example, merely serve to adjust th e viscosity and other mechanical properties of the label.

The polymeric molecules coupled to bacteriorhodopsin as high-level security feature, such as, for example, DNA or/and RNA or/an PNA molecules or/and hybrids from said molecule types, may be detected, for example, by suitable amplification reactions such as the PCR reaction by mean s of specific primers. The detection here may include gel-electrophoretic size analysis but also direct nucleic acid base sequence determination. Polypeptides may be analyzed and detected in a similar manner by microanalytical sequence determination owing to the possibilities provided by the organic synthesis of nucleic acids and polypeptides, it is also possible to utilize not naturally occurring sequences.

The combination of low-level security features with high-level security features provides interesting advantages. Such a combination may be obtained, for example, by combining the photochromic property of bacteriorhodopsin as low-level security feature with one of the abovementioned high-level security features. To this end, it is particularly advantageous to use bacteriorhodopsin together with a polymeric molecule. However, the bacteriorhodopsin or a bacteriorhodopsin variant may also be used itself as analyzable polymeric molecule. In spite of enormous variability, the security features are inextricably linked to one another. Additionally, it is possible to use in addition t o bacteriorhodopsin as photochromic material polymers different therefrom, which are coupled to BR or/and in free form.

The method of the invention for protecting the authenticity of objects comprises applying a photochromic preparation in the form of an ink or printing ink to the particular object. In this connection, the photochromic preparation of the invention contains besides wild-type bacteriorhodopsin or/and at least one bacteriorhodopsin variant as photochromic portion, where appropriate, suitable auxiliary substances and/or suitable matrix materials.

The auxiliary substances are employed for the application process: for avoiding foaming and for improving the properties or/and for stability: for microencapsulating the preparation materials and for protection from UV rays or/and for improving the visual optical impression: for influencing the absorption spectrum, for example in the unbleached and bleached state of bacteriorhodopsin material. Examples of such auxiliary substances are passive dyes or pigments which are simply admixed with the ink in order to achieve a desired initial or final color. In this way it is also possible to produce mixed colors or/and to shift the spectrum.

Suitable matrix materials are employed for fixing the preparation material by physical inclusion or/and by covalent coupling to the matrix material or/and by subsequent crosslinking of the preparation material or the matrix material by means of chemical or photo chemical methods. In this connection, crosslinking may include treatment with glutaraldehyde, trans-glutaminase, (free-radical) polymerization or/and photochemical crosslinking.

The photochromic preparation of the invention may be applied by means, of known printing processes such as, for example, offset, screen, inkjet or pad printing by mechanical application by means of brushes, by spraying, dipping or electrophoresis. The bacteriorhodopsin material of the invention may be solidified by subsequent drying and the synthetic or biological matrix material can be rendered insoluble by a posttreatment. The preparation itself or an auxiliary substrate to which the preparation has been applied can be applied. The bacteriorhodopsin preparation may be present in microencapsulated form. Microencapsulated color preparations are particularly suitable for printing processes.

In a particularly preferred embodiment of the method of the invention and in order to label an object by using the photochromic ink, the photochromic ink is applied to the object, subsequently solidified by drying and fixed by means of a matrix material, it being possible to produce a color change of the photochromic preparation by exposure. The minimum light energy required for the color change may preferably be set via the pH of the photochromic preparation.

Furthermore, it is preferred to apply to an object to be labeled two areas A and B which are in particular adjacent, with the first area A being labeled with the ink containing a bacteriorhodopsin variant and the second field B being provided with a non-photochromic dye whose spectral emission in the unexposed state does not differ from that of the first field but which, after exposure, displays an emission which is different compared with the first field. Furthermore, it is also possible to apply to the object to be labeled two in particular adjacent areas A and B, with the first field being labeled with a first bacteriorhodopsin-containing photochromic preparation and the second field being provided with a second photochromic preparation whose light sensitivity differs from that of the first preparation so that in the unexposed state the second field does not differ from the first field in its spectral emission but displays, after exposure, a different emission compared with the first field. The second photochromic preparation preferably contains bacteriorhodopsin wild-type or/and a bacteriorhodopsin variant which is different from the BR variant used in the first preparation and serves in particular as reference color.

The invention further relates to a photochromic ink which contains at least one, preferably at least two, bacteriorhodopsin variants. The preferred bacteriorhodopsin variants are as described above, and a photochromic ink of this kind is suitable in particular for labeling objects for protecting the authenticity.

The ink of the invention can be used in combination with conventional dyes known to the skilled worker, such as fluorochrome, pigments or/and other photochromic pigments. The bacteriorhodopsin material-containing ink according to the invention may be used like conventional ink and can also be used for decoration and for other special effects, in addition to protecting the authenticity of objects.

The term "ink" here means also any colored writing liquid/printing liquid and, where appropriate, pulverized application medium. The term ink also includes printing inks and other color compositions which can be used to print on objects or which are generally used for generating prints. When using the bacteriorhodopsin materials as ink, water or other solvents such as, for example, those based on alcohol may be used as solvents. The ink preferably comprises at least two BR variants. The use of at least two bacteriorhodopsin variants or of one bacteriorhodopsin variant which has at least two modifications provides advantageous effects for an analysis, due to the fact that the analysis can be carried out two dimensionally. Besides the preferred purple membrane form of bacteriorhodopsin, the ink of the invention may additionally contain bacteriorhodopsin in solubilized form.

Bacteriorhodopsin in solubilized form can be obtained by expressing the bacteriorhodopsin gene in a host such as, for example, *E. coli* and by reconstituting with added retinal aldehyde. It is also possible to obtain bacteriorhodopsin from purple membrane by removing the lipids. For this purpose, for example, a purple membrane suspension ($OD_{570}<5$) is mixed with 1% Triton-X 100 in water or buffer and continuously sonicated for 1 h using a sonifier microprobe. The supernatant obtained after centrifugation contains bacteriorhodopsin in solubilized form.

The BR-containing photochromic preparation may be applied to any object. Examples of objects of particular interest are documents, securities, bank notes, works of art, identity cards, clothes, motor vehicles, test symbols, quality seals, etc.

Another embodiment of the invention therefore relates to an object having a label which contains at least one bacteriorhodopsin variant. Preference is given to preparing said label using the method of the invention. The label preferably contains a photochromic ink as described above.

As already explained above, bacteriorhodopsin wild-type has a low light sensitivity so that it is virtually impossible under normally intensive light sources, for example sunlight, to produce bleaching which is easily detectable with the naked eye. The reason for this low light sensitivity is a low M state half-life.

However, it is possible to increase the M state half-life of bacteriorhodopsin wild-type by suitable measures. The invention therefore further relates to a method for protecting the authenticity of an object by applying a photochromic ink to the object, which comprises using a photochromic ink containing as photochromic portion bacteriorhodopsin wild-type which, when illuminated with light of the visible wavelength range, undergoes a visually detectable reversible change of state, utilizable as low-level security feature in an authenticity check, and which ink furthermore contains an auxiliary substance which binds water or/and reduces the availability of protons. Auxiliary substances which increase the low light sensitivity of bacteriorhodopsin wild-type make it possible to use bacteriorhodopsin wild-type, too, in methods for protecting the authenticity. Such auxiliary substances which are used as additives in the ink serve to increase the half-life of the M state of bacteriorhodopsin wild-type. The M state half-life of bacteriorhodopsin wild-type increases if water is almost completely removed. The auxiliary substances thus essentially have the purpose of binding water and reducing proton availability. Examples of suitable auxiliary substances are compounds which contain primary or secondary amino groups. Particular preference is given to using arginine or guanidinium x HCl as auxiliary substances. These auxiliary substances may also be used in bacteriorhodopsin variants to increase the light sensitivity.

In the method of the invention for protecting the authenticity of an object, the photochromic ink used thus preferably contains a BR variant or BR mutant, the mutation being used as information for a high-level security feature and/or for increasing the light sensitivity. Particular preference is given to using variants which contain at least two modifications, namely a modification for increasing the light sensitivity of the bacteriorhodopsin and another one which can be detected as high-level security feature using known methods.

Owing to the low light sensitivity (wild-type bacteriorhodopsin does not change its color noticeably at common illumination levels), the use of wild-type bacteriorhodopsin alone is of only limited suitability and, owing to the general availability of wild-type bacteriorhodopsin, also only of relatively low interest for authenticity protection. However, using a combination of bacteriorhodopsin wild-type and one of the above-described additives for increasing the light sensitivity makes it possible to develop interesting applications. In another preferred embodiment, the above-described additives for increasing the light sensitivity or other additives, for example for adjusting the initial color, labels, etc. are used together with one or more bacteriorhodopsin variants or bacteriorhodopsin mutants.

The invention further provides a method for protecting the authenticity of an object comprising applying to the object a photochromic ink comprising as a photochromic portion bacteriorhodopsin wild-type which, when illuminated with light of the visible wavelength range, undergoes a visually detectable reversible change of state, utilizable as low-level security feature in an authenticity check, and which ink furthermore comprises an auxiliary substance which binds water or/and reduces the availability of protons.

The following examples in connection with FIGS. 1 and 2 illustrate the invention in more detail.

EXAMPLE 1

Low-level Security Feature Check

Figure 1:
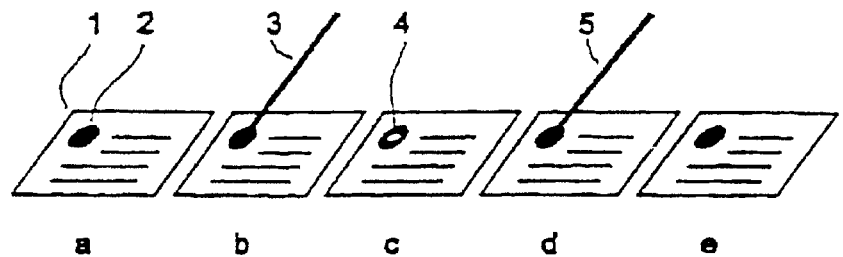
FIG. 1 depicts the procedure of an authenticity check method.

The user can readily check the photochromic properties of bacteriorhodopsin or BR variants (FIG. 1). A feature 2 applied to a document 1 such as, for example, a bank note, a security, a work of art or another valuable object and prepared from a preparation containing the bacteriorhodopsin variant D96N can be checked, for example, by the fact that it changes its color from purple to yellow when illuminated with light 3 of a light-emitting diode having an emission maximum in the green or yellow range. This is particularly readily recognizable in 4 when the area is not completely illuminated. Without further manipulation, the purple color reappears after a few seconds to minutes, depending on the preparation used, and the initial state is reestablished. Alternatively, the purple color can be reestablished immediately by illuminating with light 5 of a light-emitting diode having an emission maximum in the blue range. The technical complexity of the check is negligible. The user can follow the color change with the naked eye but the measurement can also be carried out by machines.

EXAMPLE 2

Copy Protection

Figure 2:
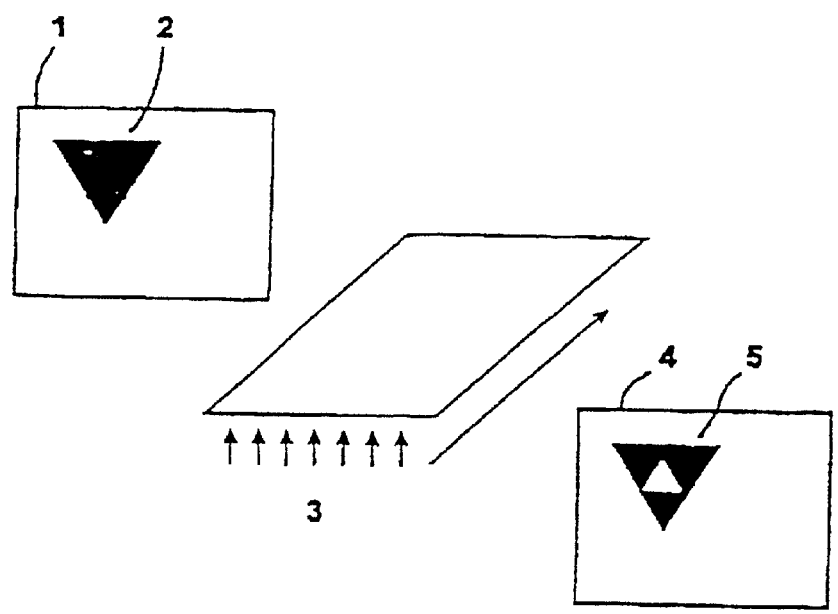
FIG. 2 depicts a copying process using a security feature.

A document 1 containing a feature 2 of the invention, in which feature a combination of a particular amount of light-sensitive bacteriorhodopsin material, for example of the bacteriorhodopsin wild-type, and a bacteriorhodopsin material with higher light sensitivity, for example the bacteriorhodopsin variant D96N, is used, has in the unexposed state a uniform area of identical color (FIG. 2). Instead of the insensitive bacteriorhodopsin material, it is also possible to use a suitable dye of the same color. If said document is copied with the aid of a photocopier 3 then, due to the illumination with light during the copying process, the light-sensitive bacteriorhodopsin material is bleached more strongly than the surrounding material of lower light sensitivity. As a result, the copy 4 will show a low-level security feature 5 in which the feature will permanently retain its different color. This makes it possible to unambiguously recognize the copy as a copy.

EXAMPLE 3

Posttreatment, Auxiliary Substances and Application Methods a) Subsequent Crosslinking A substrate with a dried photochromic layer consisting of the matrix material and the bacteriorhodopsin was overlaid with a 40% glutardialdehyde solution for 15 minutes. The glutardialdehyde solution was then washed off with water. The photochromic layer has been rendered water-insoluble by the treatment.

b) Photochemically 10 mg of purple membrane (BR-D96N) were finely dispersed in 4 ml of a UV-curable ink (IFS3000 from Schmitt). After applying the mixture by means of a doctor blade, the curing was carried out under UV light overnight.

c) Application

Screen Printing

The principle of screen printing is porous printing, similar to a masking technique. The printing plate consists of a mesh fabric which is provided with a barrier layer impermeable to ink. The print motif remains open. Printing is carried out by brushing the ink-filled screen using a doctor blade. In the process, the ink is transferred to the substrate below. A screen printing ink was prepared by stirring 100 mg/ml pigment (bacteriorhodopsin wild-type) into a 7.2% PVA solution (Mowiol type 56–98) overnight. Where the Theological properties agreed with a standard sample, it was possible to use the mixture obtained for printing in a conventional screen printing press.

Offset Printing 1 g of purple membrane (BR-D96N) was stirred into 5 ml of an ink without pigment (Schmitt, IUF01) at 50° C. It was possible to use the mixture obtained in this way for printing by means of common offset technique.

d) Mechanical Protection

Laminating

The photochromic mixture containing bacteriorhodopsin and applied to a substrate was laminated in using a hot laminator (GPM, Mylam 9) with a film pouch of type GHQ-120TR at a temperature of from 90–140° C.

e) Auxiliary Substances

Prevention of Foaming

PVA (type Mowiol 56–98, 68 mg/ml) was dissolved in water at 50° C. Purple membrane in freeze-dried form was added to this mixture thereby obtaining a concentration of 11 mg/ml. 1-Octanol (1% v/v) was stirred into this mixture at room temperature. The mixture obtained in this way had improved properties when applying ink with respect to the formation of bubbles.

Protection From UV Irradiation

In order to protect the photochromic pigment, the mixture was mixed with one of the following UV absorbers or a derivative thereof at a concentration of from 1–30%, preferably 3–10% w/w: benzophenone, hydroxynaphthoquinone, phenylbenzoxazole, cinnamic ester, sulfonamide, aminobenzoic ester.

EXAMPLE 4

A use document such as, for example, a bank note which has been provided with the bacteriorhodopsin-containing security label. During exposure, the security label changes its color from violet to yellow. After a short time (approx. 30–60 s) and/or during exposure to light of the blue wavelength range, the originally violet color reappears. A use document of this kind would be protected against illegal copying or forgery.

EXAMPLE 5

As example 4, but exposure to light of the blue wavelength range leads to a color change from yellow to violet. After exposure, the original color reappears due to the ambient light.

EXAMPLE 6

A document such as, for example, a contract which has been provided with a violet bar. This bar is produced by double printing using two masks which behave like a positive and negative. Using these two masks makes it possible to use two ink preparations which differ in their light sensitivity. When exposed to white light, the more light-sensitive layer changes color from violet to yellow, while the other layer changes color only very slightly, if at all. This leads to a color contrast. This makes it possible to highlight from the previously homogeneous area a word (e.g. original) or any other sequence of signs and/or pictograms.

EXAMPLE 7

As 6, but printing is on normal paper or photopaper which can be laminated in afterwards. Attached to a brand article (clothes such as, for example, jeans or the like) or added to a brand article, said document can then guarantee the authenticity of said brand article and thus prevent product piracy.

EXAMPLE 8

In order to protect a document from illegal copying, an apparently homogeneous area is generated using two masks, as in 6. During copying, a part of the homogeneous area undergoes a color change so that the copy is marked by an inhomogeneous area.

What is claimed is:

1. A method for protecting the authenticity of an object comprising applying to the object a photochromic ink which protects the authenticity of the object by comprising as a photochromic portion at least one bacteriorhodopsin variant which when illuminated with light of the visible wavelength range undergoes a visually detectable reversible change of state, utilizable as low-level security feature for an authenticity check, and which ink has in addition to the low-level security feature one or more visually undetectable high-level security features detectable only by instrumental analysis, thereby protecting the authenticity of the object.

2. The method as claimed in claim 1, characterized in that the bacteriorhodopsin variant is selected from functional variants, sequence variants, derivatization variants, chromophoric variants, isotope variants or/and spin label variants.

3. The method as claimed in claim 2, characterized in that a bacteriorhodopsin variant having the following features is used:
   a) The region required for the formation of the purple membrane of the protein is unchanged compared with the bacteriorhodopsin wild-type,
   b) loops or/and the C terminus or/and the N terminus of the polypeptide chain contain, compared with the bacteriorhodopsin wild-type at least one amino acid exchange comprising deletions, additions, insertions or/and substitutions, these amino acid exchanges not changing the photochromic properties of bacteriorhodopsin, which properties are determined by the photochromic region.

4. The method as claimed in claim 3, characterized in that a bacteriorhodopsin variant in which at least one amino acid has been added at the C terminus is used.

5. The method as claimed in claim 4, characterized in that the bacteriorhodopsin variant contains at least one cysteine.

6. The method as claimed in claims 1, 2, 3, 4 or 5, characterized in that the bacteriorhodopsin variant used has a photocycle different from the wild-type and an initial color different from the wild-type.

7. The method as claimed in claims 1, 2, 3, 4 or 5, characterized in that a BR variant selected from D36C, D96N and D85N is used.

8. The method as claimed in claims 1, 2, 3, 4 or 5, characterized in that the photochromic ink comprises another polymeric molecule.

9. The method as claimed in claims 1, 2, 3, 4 or 5, characterized in that a bacteriorhodopsin variant in which a polymeric molecule is coupled to bacteriorhodopsin is used.

10. The method as claimed in claim 9, characterized in that the polymeric molecule is a polypeptide which, where appropriate, has non-peptide portions.

11. The method as claimed in claim 9, characterized in that the polymeric molecule comprises nucleic acids or/and derivatives thereof which, where appropriate, have non-nucleic acid portions.

12. The method as claimed in claim 11, characterized in that the nucleic acids couple to the bacteriorhodopsin and/or their derivatives are detected by suitable amplification reactions.

13. The method as claimed in claim 12, characterized in that the sequence of the amplification products is determined.

14. The method as claimed in claims 1, 2, 3, 4 or 5, characterized in that the photochromic portion preparation comprises at least two bacteriorhodopsin variants or/and one bacteriorhodopsin variant with at least two modifications.

15. The method as claimed in claims 1, 2, 3, 4 or 5, characterized in that the photochromic ink further comprises a material
   a) for preventing foaming and for improving the wetting properties or/and
   b) for microencapsulating the ink materials and for screening off UV rays to improve stability or/and
   c) for influencing the absorption spectrum of bacteriorhodopsin material to improve the visual impression.

16. The method as claimed in claims 1, 2, 3, 4 or 5, characterized in that further matrix materials are employed for attaching the photochromic portion by
   a) physical inclusion or/and
   b) covalent coupling to the matrix material or/and
   c) crosslinking.

17. The method as claimed in claim 16, characterized in that the bacteriorhodopsin variant is finely distributed in a color curable by means of UV light and that crosslinking is carried out by irradiation with UV light.

18. The method as claimed in claims 1, 2, 3, 4 or 5, characterized in that the photochromic ink itself or an auxiliary substrate to which the ink has been applied is applied to the object.

19. The method as claimed in claims 1, 2, 3, 4 or 5, characterized in that two, adjacent, areas A and B are applied to the object to be labeled, the first area A being labeled with the photochromic ink containing bacteriorhodopsin and the second field B being provided with a non-photochromic dye whose spectral emission in the unexposed state is not different from that of the first field but which displays, after exposure, a different emission compared with the first field.

20. The method as claimed in claims 1, 2, 3, 4 or 5, in which two, adjacent, areas A and B are applied to the object to be labeled, the first field being labeled with a first photochromic preparation containing bacteriorhodopsin and the second field being provided with a second photochromic preparation whose light sensitivity differs from that of the first preparation so that in the unexposed state the second field is not different in its spectral emission from the first field but displays, after exposure, a different emission compared with the first field.

21. An object labeled according to a method as claimed in claims 1, 2, 3, 4 or 5.

22. A method for protecting the authenticity of an object comprising by applying to the object a photochromic ink comprising as a photochromic portion bacteriorhodopsin wild-type which, when illuminated with light of the visible wavelength range, undergoes a visually detectable reversible change of state, utilizable as low-level security feature in an authenticity check, and which ink furthermore comprises an auxiliary substance which binds water or/and reduces the availability of protons.

23. A photochromic ink, characterized in that it contains at least one bacteriorhodopsin variant.

* * * * *